US008328385B2

(12) United States Patent
Catalano et al.

(10) Patent No.: US 8,328,385 B2
(45) Date of Patent: Dec. 11, 2012

(54) UNIVERSAL LIGHT EMITTING DIODE ILLUMINATION DEVICE AND METHOD

(75) Inventors: Anthony Catalano, Boulder, CO (US); Daniel Harrison, Nederland, CO (US)

(73) Assignee: TerraLUX, Inc., Longmont, CO (US)

(*) Notice: Subject to any disclaimer, the term of this patent is extended or adjusted under 35 U.S.C. 154(b) by 0 days.

(21) Appl. No.: 13/225,688

(22) Filed: Sep. 6, 2011

(65) Prior Publication Data

US 2012/0044673 A1    Feb. 23, 2012

Related U.S. Application Data

(63) Continuation of application No. 12/716,633, filed on Mar. 3, 2010, now Pat. No. 8,033,682, which is a continuation of application No. 12/244,645, filed on Oct. 2, 2008, now Pat. No. 7,699,494, which is a continuation of application No. 11/831,791, filed on Jul. 31, 2007, now Pat. No. 7,448,770, which is a continuation of application No. 11/026,796, filed on Dec. 31, 2004, now Pat. No. 7,300,173, which is a continuation-in-part of application No. 10/820,930, filed on Apr. 8, 2004, now Pat. No. 7,318,661.

(60) Provisional application No. 60/502,495, filed on Sep. 12, 2003.

(51) Int. Cl.
*F21L 4/04* (2006.01)
(52) U.S. Cl. .................... 362/202; 362/208; 362/249.02
(58) Field of Classification Search .......... 362/211–215, 362/230–231, 157, 184, 194–208, 253, 294, 362/249.02, 800
See application file for complete search history.

(56) References Cited

U.S. PATENT DOCUMENTS

| 3,795,830 | A | | 3/1974 | Richardson |
| 4,211,955 | A | | 7/1980 | Ray |
| 4,727,289 | A | | 2/1988 | Uchida |
| 5,097,180 | A | | 3/1992 | Ignon et al. |
| 5,189,339 | A | | 2/1993 | Peshak |
| 5,222,800 | A | | 6/1993 | Chan et al. |
| 5,463,280 | A | | 10/1995 | Johnson |
| 5,465,197 | A | | 11/1995 | Chien |
| 5,561,346 | A | | 10/1996 | Byrne |
| 5,575,459 | A | | 11/1996 | Anderson |
| 5,632,551 | A | | 5/1997 | Roney et al. |
| 5,655,830 | A | | 8/1997 | Ruskouski |
| 5,663,719 | A | | 9/1997 | Deese et al. |
| 5,749,646 | A | * | 5/1998 | Brittell ......................... 362/231 |
| 5,850,126 | A | | 12/1998 | Kanbar |
| 5,936,599 | A | | 8/1999 | Reymond |

(Continued)

FOREIGN PATENT DOCUMENTS

JP    2004146205    5/2004

*Primary Examiner* — Bao Q Truong
(74) *Attorney, Agent, or Firm* — Bingham McCutchen LLP

(57) ABSTRACT

Disclosed is a method and apparatus for providing a light emitting diode and driving circuitry integrated into a component module that will retrofit common incandescent lightbulb applications. The disclosed embodiments will perform with high efficiency at a wide operating voltage range with a very small size allowing for the incorporation within the envelope and form of existing lightbulb bases. Therefore, a single universal LED light bulb module can be used to replace the dozens of conventional LED and incandescent lights currently being used. The electronic circuitries used to drive the LEDs are extremely compact and consequently can be incorporated in nearly any standard bulb base.

20 Claims, 12 Drawing Sheets

U.S. PATENT DOCUMENTS

| | | | |
|---|---|---|---|
| 5,994,845 A | 11/1999 | Gibboney, Jr. | |
| 6,019,493 A | 2/2000 | Kuo et al. | |
| 6,091,614 A | 7/2000 | Malenfant | |
| 6,111,739 A | 8/2000 | Wu et al. | |
| 6,140,776 A | 10/2000 | Rachwal | |
| 6,150,771 A | 11/2000 | Perry | |
| 6,161,910 A | 12/2000 | Reisenauer et al. | |
| 6,184,628 B1 | 2/2001 | Ruthenberg | |
| 6,190,020 B1 | 2/2001 | Hartley | |
| 6,218,785 B1 | 4/2001 | Incerti | |
| 6,220,722 B1 | 4/2001 | Begemann | |
| 6,232,784 B1 * | 5/2001 | Dulasky | 324/506 |
| 6,234,645 B1 * | 5/2001 | Borner et al. | 362/231 |
| 6,234,648 B1 | 5/2001 | Borner et al. | |
| 6,242,870 B1 | 6/2001 | Koyanagi et al. | |
| 6,310,445 B1 | 10/2001 | Kashaninejad | |
| 6,313,589 B1 | 11/2001 | Kobayashi et al. | |
| 6,371,636 B1 | 4/2002 | Wesson | |
| 6,380,865 B1 | 4/2002 | Pederson | |
| 6,485,160 B1 | 11/2002 | Sommers et al. | |
| 6,528,954 B1 | 3/2003 | Lys et al. | |
| 6,570,505 B1 | 5/2003 | Malenfant | |
| 6,580,228 B1 | 6/2003 | Chen et al. | |
| 6,595,671 B2 | 7/2003 | Lefebvre et al. | |
| 6,626,557 B1 * | 9/2003 | Taylor | 362/235 |
| 6,634,771 B2 * | 10/2003 | Cao | 362/294 |
| 6,644,841 B2 | 11/2003 | Martineau | |
| 6,727,652 B2 | 4/2004 | Sivacumarran | |
| 6,791,283 B2 | 9/2004 | Bowman et al. | |
| 6,793,374 B2 | 9/2004 | Begemann | |
| 6,819,056 B2 | 11/2004 | Lin | |
| 6,853,151 B2 | 2/2005 | Leong et al. | |
| 6,871,983 B2 * | 3/2005 | Jacob et al. | 362/364 |
| 6,893,140 B2 | 5/2005 | Storey et al. | |
| 6,924,605 B2 | 8/2005 | Chun | |
| 6,948,829 B2 | 9/2005 | Verdes et al. | |
| 6,957,897 B1 | 10/2005 | Nelson et al. | |
| 6,981,784 B2 | 1/2006 | Dubuc | |
| 7,008,084 B2 | 3/2006 | Galli | |
| 7,015,650 B2 | 3/2006 | McGrath | |
| 7,204,602 B2 | 4/2007 | Archer | |
| RE39,856 E | 9/2007 | Ruthenberg | |
| 7,296,913 B2 | 11/2007 | Catalano et al. | |
| 7,300,173 B2 | 11/2007 | Catalano et al. | |
| 7,318,661 B2 | 1/2008 | Catalano | |
| 7,448,770 B2 | 11/2008 | Catalano et al. | |
| 7,597,456 B2 | 10/2009 | Catalano et al. | |
| 7,699,494 B2 | 4/2010 | Catalano et al. | |
| 7,777,430 B2 | 8/2010 | Catalano et al. | |
| 7,852,015 B1 | 12/2010 | Yen et al. | |
| 7,946,730 B2 | 5/2011 | Catalano et al. | |
| 8,033,682 B2 * | 10/2011 | Catalano et al. | 362/202 |
| 2001/0014019 A1 | 8/2001 | Begemann | |
| 2002/0030455 A1 | 3/2002 | Ghanem | |
| 2002/0130786 A1 | 9/2002 | Weindorf | |
| 2002/0141196 A1 | 10/2002 | Camarota et al. | |
| 2002/0176250 A1 * | 11/2002 | Bohler et al. | 362/236 |
| 2003/0039122 A1 | 2/2003 | Cao | |
| 2003/0067787 A1 | 4/2003 | Serizawa | |
| 2003/0103348 A1 * | 6/2003 | Hung | 362/247 |
| 2003/0112627 A1 | 6/2003 | Deese | |
| 2003/0179548 A1 | 9/2003 | Becker et al. | |
| 2003/0210552 A1 | 11/2003 | Barlian et al. | |
| 2004/0028099 A1 | 2/2004 | Hongo et al. | |
| 2004/0070990 A1 | 4/2004 | Szypszak | |
| 2004/0189262 A1 | 9/2004 | McGrath | |
| 2005/0052865 A1 | 3/2005 | Siktberg et al. | |
| 2005/0057187 A1 | 3/2005 | Catalano | |
| 2005/0225985 A1 | 10/2005 | Catalano et al. | |
| 2006/0012997 A1 | 1/2006 | Catalano et al. | |
| 2006/0250270 A1 | 11/2006 | Tangen | |
| 2008/0019123 A1 | 1/2008 | Catalano et al. | |
| 2008/0024070 A1 | 1/2008 | Catalano et al. | |
| 2008/0099770 A1 | 5/2008 | Mendendorp et al. | |
| 2008/0130288 A1 | 6/2008 | Catalano et al. | |
| 2009/0034262 A1 | 2/2009 | Catalano et al. | |
| 2009/0309501 A1 | 12/2009 | Catalano et al. | |
| 2010/0027085 A1 | 2/2010 | Catalano | |
| 2010/0117560 A1 | 5/2010 | Cao | |
| 2010/0165611 A1 | 7/2010 | Catalano et al. | |
| 2010/0320499 A1 | 12/2010 | Catalano et al. | |
| 2011/0019417 A1 | 1/2011 | Van Laanen et al. | |

\* cited by examiner

TOP VIEW

BOTTOM VIEW

SIDE VIEW

TOP VIEW

BOTTOM VIEW

SIDE VIEW

UNIVERSAL LIGHT EMITTING DIODE ILLUMINATION DEVICE AND METHOD

RELATED APPLICATIONS

This application is a continuation of U.S. patent application Ser. No. 12/716,633, filed on Mar. 3, 2010, which is a continuation of U.S. patent application Ser. No. 12/244,645, filed on Oct. 2, 2008, issued as U.S. Pat. No. 7,699,494, which is a continuation of U.S. patent application Ser. No. 11/831,791, filed on Jul. 31, 2007, issued as U.S. Pat. No. 7,448,770, which is a continuation of U.S. patent application Ser. No. 11/026,796, filed on Dec. 31, 2004, issued as U.S. Pat. No. 7,300,173, which is a continuation-in-part of U.S. patent application Ser. No. 10/820,930, filed on Apr. 8, 2004, issued as U.S. Pat. No. 7,318,661, which claims the benefit of and priority to U.S. Provisional Patent Application No. 60/502,495, filed on Sep. 12, 2003, the entire disclosure of each of which is hereby incorporated herein by reference.

FIELD OF THE INVENTION

The present invention relates to a light emitting diode illumination device and method and more specifically to a light emitting diode and driving circuitry integrated into a component module that will retrofit common incandescent lightbulb applications.

BACKGROUND

Currently, lightbulbs for low power lighting applications such as flashlights are dominated by incandescent lights that use hot filaments to provide radiant energy. The radiation that is emitted by hot filaments is spread over a wide spectral range and much of the energy is wasted owing to emission outside the visible range. Moreover, such filaments must be designed for the specific voltage of operation, e.g., a bulb designed for 2.7 volt (V) operation cannot be used for operation at a higher, 3.6 V level without causing immediate premature failure. Similarly, operating at a lower voltage, such as 2.2 V lowers the light output to unacceptable levels. In addition, wide varieties of low power lightbulb bases have been established over the last hundred years. Even without considering additional application factors, the combination of these two factors alone means that hundreds of distinct lightbulbs must be manufactured in order to meet specific application demands.

Light emitting diodes (LEDs) have operating advantages with respect to incandescent lights. LEDs can emit light in a narrow range of wavelengths so that a high proportion of the input energy is converted into light emitted within a specific wavelength envelope, resulting in application specificity and high efficiency. Such lights have very long life compared to incandescent lights (50,000 hours vs. 3-30 hrs for incandescent flashlight bulbs). Like incandescent bulbs, LEDs require a specific, narrow operating voltage range, ordinarily from 3.2 V to 4 V. Higher voltage results in premature failure and lower voltage results in little or no light output. Conventional LED illumination devices share high application specificity, resulting in a similarly large number of distinct products as with ordinary incandescent bulbs. This discourages conventional LED use, as retailers must now carry twice the already excessive inventory of the same product. In addition, LED lightbulbs for various voltages are commonly fabricated by incorporating a ballast resistor serving as a current limiter. This technique wastes energy and does not markedly increase the voltage operating range. LED circuits with current and voltage regulation have been utilized in applications such as traffic lights where large numbers of LEDs are packaged together to provide a bright, long lasting and highly efficient lighting. However, in a traffic light application, space is not a limitation, and so fairly complex and bulky electronic circuits have been used to meet these specialized needs.

SUMMARY

The present invention overcomes the disadvantages and limitations of the prior art by providing a light emitting diode and driving circuitry integrated into a component module that will retrofit common incandescent lightbulb applications. The disclosed embodiments will perform with high efficiency at a wide operating voltage range with a very small size allowing for the incorporation within the envelope and form of existing lightbulb bases. Therefore, a single universal LED light bulb module can be used to replace the dozens of conventional LED and incandescent lights currently being used. The electronic circuitries used to drive the LEDs are extremely compact and consequently can be incorporated in nearly any standard bulb base. Because the operating voltage of these circuits is so wide, they are able to effectively draw out the last bit of energy present in a battery pack, providing excellent efficiency and capacity. For example, a 6 V battery pack will still operate the LED at full brightness when it only delivers slightly in excess of 1.5 V; in other words, the batteries are effectively "dead" with respect to conventional light bulbs, but this embodiment still operate as though the batteries were fully charged. In fact, there is little or no change in the light output from 6 V down to approximately 1.5 V, allowing for the use of nearly all the energy available from the battery. In addition, a 3 V battery pack and a 6 V battery pack for example, would use the exact same light bulb as described in this invention, being completely interchangeable.

The universal LED light bulb module can be driven by a circuit that is either a constant voltage output or a constant current output. The constant current design is preferred since light output is directly proportional to current, and slight differences in the LED manufacture require different operating voltages for a given light output. This constant current circuit is a high frequency, low power dc/dc converter. The high frequency of operation allows components of small size to be used. The essential feature of this circuit is a voltage comparator that regulates the voltage to a specified value to achieve the desired output. An inductor is charged to achieve the desired voltage output in the circuit. In the constant current implementation, a current sensing resistor is used to provide the voltage feedback. Although often designed for DC-to-DC operation in the range discussed, the disclosed constant current circuit can be easily modified to work at higher voltages by using for instance, a zener diode resistor combination, or to operate as an AC/DC converter by adding a rectifier circuit. Other features such as light sensors, pulse circuits etc., can be added to provide additional features such as flashing operation or dimming. Various logic signals can be easily adapted to introduce added functionality to the embodiments. For example, a single activation of a power switch could provide a low output light, a second activation producing a medium output light, a third activation producing a high output light, and a fourth activation shutting off the light. Multiple colored LEDs can also be used to vary the desired colored output.

An embodiment of the present invention may therefore comprise a universal LED lamp that is capable of replacing incandescent bulbs and that operates at various voltages comprising: a standard bulb base that is adapted to fit into standard bulb sockets; a printed circuit board that is electrically connected to a voltage input contact of the standard bulb base that is capable of fitting in the envelope of the standard bulb base; a driving circuit mounted on the printed circuit board that includes a solid state voltage comparator that regulates the input voltage to maintain an output voltage at a predetermined constant value within a predetermined range of input voltages that are both above and below the predetermined output voltage; an LED that is electrically connected to the output of the driving circuit and physically connected to the printed circuit board.

An additional embodiment of the present invention may also comprise a method of producing a universal LED lamp that is capable of replacing incandescent bulbs that operate at various voltages comprising: providing a standard bulb base that is adapted to fit into standard bulb sockets; electrically connecting a printed circuit board to a voltage input contact of the standard bulb base; mounting a driving circuit on the printed circuit board that includes a solid state voltage comparator; regulating the input voltage with the driving circuit to maintain an output voltage at a predetermined constant value within a predetermined range of input voltages that are both above and below the predetermined output voltage; fitting the printed circuit board within the standard bulb base; electrically connecting an LED to the output of the driving circuit; and, physically connecting the LED to the printed circuit board.

The disclosed embodiments offer the advantage of providing a universal LED light bulb module with long life and high efficiency at a wide operating voltage range with a very small size allowing for the incorporation within the envelope and form of existing lightbulb bases. The LED illumination module has the further advantage over conventional incandescent type bulbs by providing a precise wavelength output envelope, resulting in high efficiency and application specificity. Additionally, the high frequency of operation in the drive circuitry allows components of small size to be used and allows the device to effectively draw out the last bit of energy present in a battery pack. Additional ancillary features that are not currently available in incandescent bulbs such as light sensors, pulse circuits etc., can be added to the drive circuitry to provide additional features to conventional products.

The numeric identifiers in the figures correspond to the elements as follows:

2 a transparent lens adapted to emit a majority of the light peripherally
    3 at least one light-emitting semiconductor chip
    4 a small (round) printed circuit board
    6 hard protective material encasing the electronic components 15 and 17
    9 a socket for the LED module comprising 2 and 3
    12 the pin to be electrically connected to the positive side of the battery pack
    14 the pin to be electrically connected to the negative side of the battery pack
    15 an exemplary integrated circuit (IC) component
    17 another integrated circuit (IC) component
    21 replacement reflector (shorter than original), if necessary
    22 lens replacing normal protective transparent window
    23 exemplary focused light ray
    302, . . . , 333 components of the driving circuit

DETAILED DESCRIPTION

Figure 1:
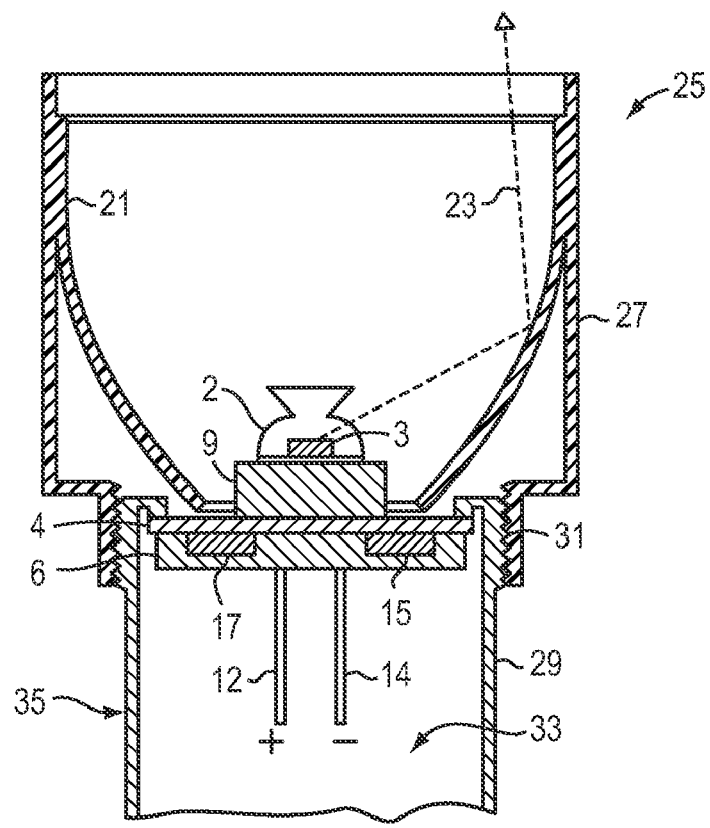
FIG. 1 is a cross-sectional view of the invention, including a reflector.
Figure 2:
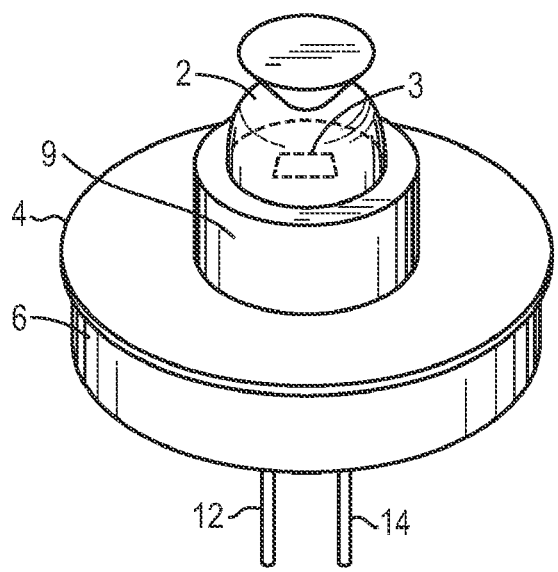
FIG. 2 is a perspective view, without showing a reflector.

A perspective view of a preferred physical form for this invention is shown in FIG. 2. A cross-section of FIG. 2 appears as FIG. 1.

In FIG. 1, the standard light bulb power connector is shown as pins 12 and 14, respectively conductively connected to the positive and negative power source of the flashlight (presumably batteries). The light emitter 3 typically would be an LED chip embedded in a transparent plastic lens 2 and a driving circuit embedded in a module. (Of course, potentially more than one light emitting chip could be used, perhaps to simulate white light with multiple chips each emitting a different wavelength.)

Also in FIG. 1, the transparent lens 2 of the light emitter preferably is so shaped that it refracts a majority of the emitted light laterally toward the reflector 21. Reflector 21 would ideally have the shape of a portion of a paraboloid, with the light-emitting chip 3 on the centerline (axis of revolution) near the focal point of the paraboloid. Alternatively, reflector 21 could simply be a portion of a cone. The reflector of the Mini Maglite® and its housing may be rotated with respect to the flashlight barrel and is attached thereto by the helically threaded, mating portions of the barrel and housing. As the reflector is rotated its focal point is moved along the centerline relative to the light-emitting chip 3. As the focal point is moved relative to the chip 3, the shape of the beam reflected off the reflector 21 is changed from a broad cone-like beam to a narrower beam. Light ray 23 is exemplary of all such rays composing the beam.

Because of the tiny size of the incandescent bulbs used in miniature flashlights, a inexpensive, conventionally-implemented driving circuit for a solid state replacement source of light would not fit within the volume envelope of the miniature bulb. Therefore, it must be at least partly exterior to that envelope. The driver circuit module of the present invention comprises a small conventional printed circuit board 4, circuit components (such as commercially available integrated circuits represented by elements 15 and 17 in FIG. 1), a potting layer 6 protecting those circuit components, a socket 9 for the support and conductor leads of the light emitter (LED), and pins 12 and 14 equivalent to the connector of the original incandescent bulb. (In the case of other types of miniature bulbs, the pins 12 and 14 might be instead some other type of connector, such as a standard screw or bayonet light bulb base.) The dimensions of the module for the Mini Maglite®, for example, would be about 15 mm in diameter and about 3 mm thick—larger than the original incandescent bulb.

Furthermore, if the flashlight has a lens housing which rotates, the module 6 provides a low friction surface in order for the reflector 21 to readily turn as it contacts module to preserve the focusing capability or to preserve the on-off switch capability.

Still further, the protective material of the module 6 must facilitate radiation and conduction of heat away from the light emitters and from the supporting circuit elements in module 6. The material, for instance, may be a thermally conductive epoxy. To increase the transfer of heat from that material to the surrounding atmosphere, the module is geometrically shaped to maximize surface area within the limited volume to facilitate the radiation of heat from the emitters and the module. Besides the gross geometry of the module 6, the surface of the module may be textured to increase its surface area. To increase the radiation of unwanted heat, the reflector itself could be fashioned from a thermally conductive material such as stamped aluminum. This would be particularly effective, because it directly contacts the module 6 in the preferred embodiment and because it has a relatively large surface area.

In flashlights like the Mini Maglite®, there would not be any available space for the driver circuit module. So, for such cases, a replacement reflector is an optional, additional element of the invention. The replacement reflector 21 would be essentially identical to the original reflector, except that a small rear portion is removed to account for the thickness of the driver circuit printed circuit board 4 and protective potting 6. Assuming that the light emitting chip 3 occupies approximately the same optical location as the filament of the original incandescent bulb, the shape of the replacement would be equivalent to the original, except for the small portion removed from the smaller open end. (Otherwise, the replacement reflector 21 would be modified slightly in shape to account for the new position of the chip relative to the original position of the filament. That is, the relationship of the focal point of the new reflector to the chip would be about the same as the relationship of the focal point of the old reflector to the filament.)

Figure 4:
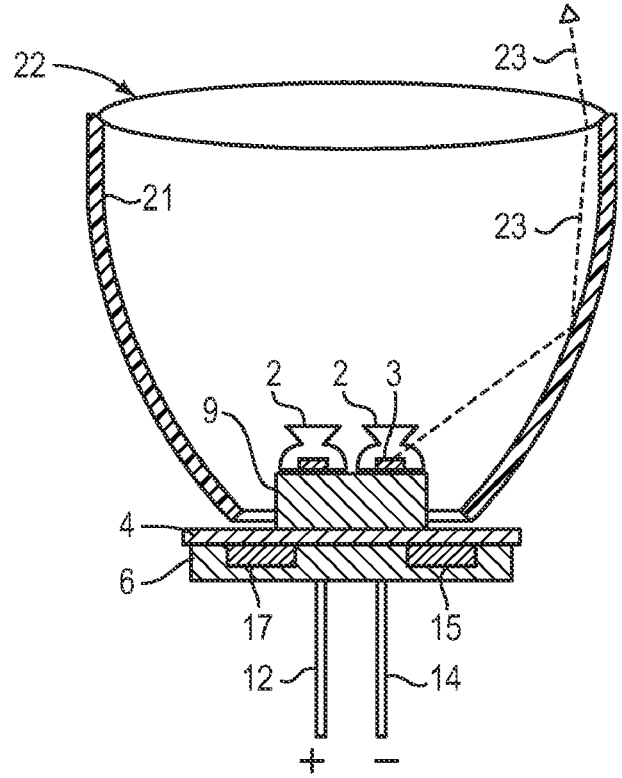
FIG. 4 is similar to FIG. 1, except that it employs multiple LEDs and a converging lens.

An alternative embodiment is shown in FIG. 4. In it there are several smaller LEDs instead of one larger one. The disadvantage of this arrangement is that the LEDs are off the midline axis, so the light will be spread out farther than with the case of FIG. 1. One partial remedy would be to replace the usual flat protective window of the flashlight with a (converging) lens. One advantage of multiple LEDs is that they could generate an approximation to white light by mixing the colors of several LEDs (such as that of red, green, and blue LEDs). Using a diffusing lens 22 (or reflector 21) which has a stippled or pebbled surface would smooth the appearance of the light, especially when multiple LEDs are present.

Figure 3:
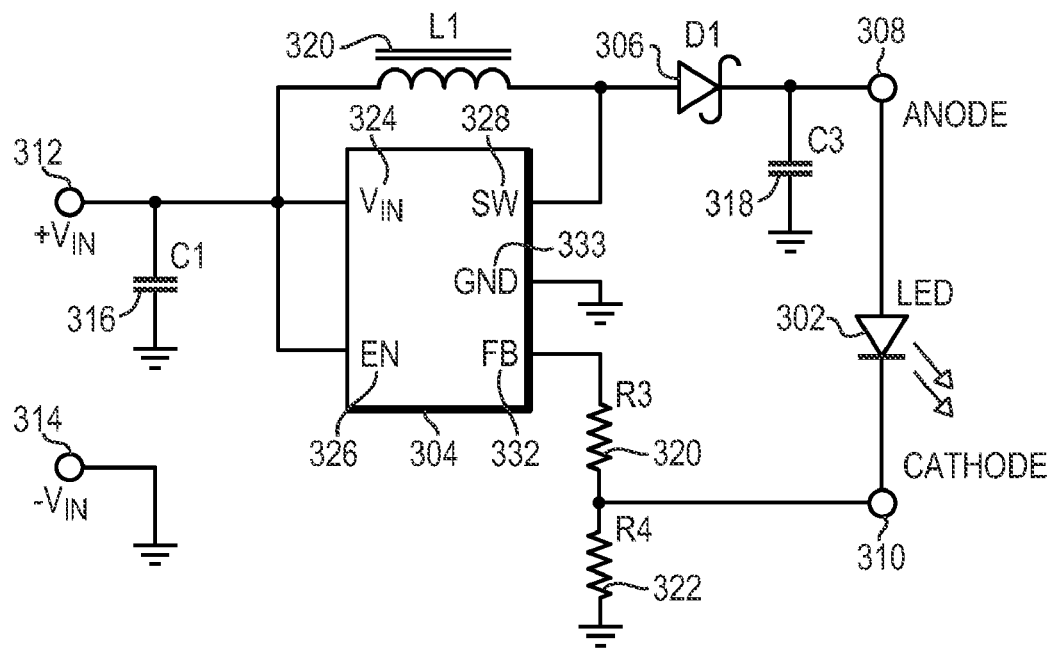
FIG. 3 is a schematic diagram of an exemplary circuit implementing the driving circuit of this invention.

A preferred embodiment of the driver circuit for this invention is shown in schematic diagram in FIG. 3, which shows a DC circuit used for a typical embodiment. A high frequency, low power DC-to-DC converter circuit is utilized to drive the LED 302. The high frequency of operation allows components of small size to be used. A positive voltage source is introduced at +Vin 312 and branched to a capacitor C1 316 and inductor L1 320 and to two inputs (Vin 324 and EN 326) of a switching circuit 304. The solid-state switching circuit 304 regulates the input voltage Vin 324 to a specified value to achieve a switched output at SW 328 by receiving an enable signal EN 326 branched from Vin 324. The inductor L1 320 is charged during the ON cycle phase of SW 328 and discharges in the OFF cycle phase to achieve the desired switched voltage output driving a Schottky diode D1 306 that in turn drives the anode side 308 of the output LED 302 and capacitor C3 318 which is terminated to ground. This Schottky diode D1 306 allows the current to flow in only one direction to the anode side 308 of the LED 302 via SW 328. The Schottky diode D1 306 also assures that there is a quantity of rectification of the AC signal flowing through the circuit so that the LED only sees half of the AC cycle, effectively acting as a DC signal. Capacitor C3 318 becomes a charge reservoir, averaging out what would otherwise be a sinusoidally varying voltage with one half of the sine wave missing.

The cathode side 310 of the LED 302 is passed through ground via R-4 322 and branched to the feedback FB pin 332 of the switching circuit 304 through resistor R3 320. The FB pin 332 acts as half of an operational amplifier that is comparing the voltage at R-4 322 above ground, to a reference voltage, (i.e., 1.23V). When the voltage at R4 322 reaches its reference voltage, the switching circuit 304 stops supplying current. The FB pin 332 therefore serves as feedback reference within the switching circuit 304, determining the current values by comparing a feedback voltage to its internal reference and deciding whether more or less charge is needed, thereby regulating the circuit current. −Vin 314, capacitors C1 316 and C3 318, resistor R4 322 and the ground terminal 330 of the switching circuit 304 are all terminated to ground.

In a constant current implementation, a current sense resistor is used to provide the voltage feedback. An integrated circuit of small size, Texas Instruments TPS61040 or TPS61041 is suitable for this purpose. Although designed for DC-to-DC operation in a suitable voltage range, the circuit can be easily modified to work at higher voltages by using a zener diode resistor combination, or to operate as an AC-to-DC converter by adding a rectifier circuit. Additional operational features such as light sensors, timers, etc., could be added to provide for dimming or automatic shut-off functions. Multiple colored LEDs can be used to vary the desired colored output. Although only one LED is shown, several LEDs can be combined in a series circuit, parallel circuit or series-parallel circuit up to the limitations of the IC used. An appropriate LED may be chosen for use in this circuit to suit the particular application and sized to closely match the bulb dimensions and intensities of conventional lamps. The circuit shown in FIG. 3 can be implemented in either a constant voltage output design or a constant current output design. The constant current design has advantages since light output is directly proportional to current, whereas slight variations in the LED manufacture require different operating voltages for a specific light output.

Figure 5:
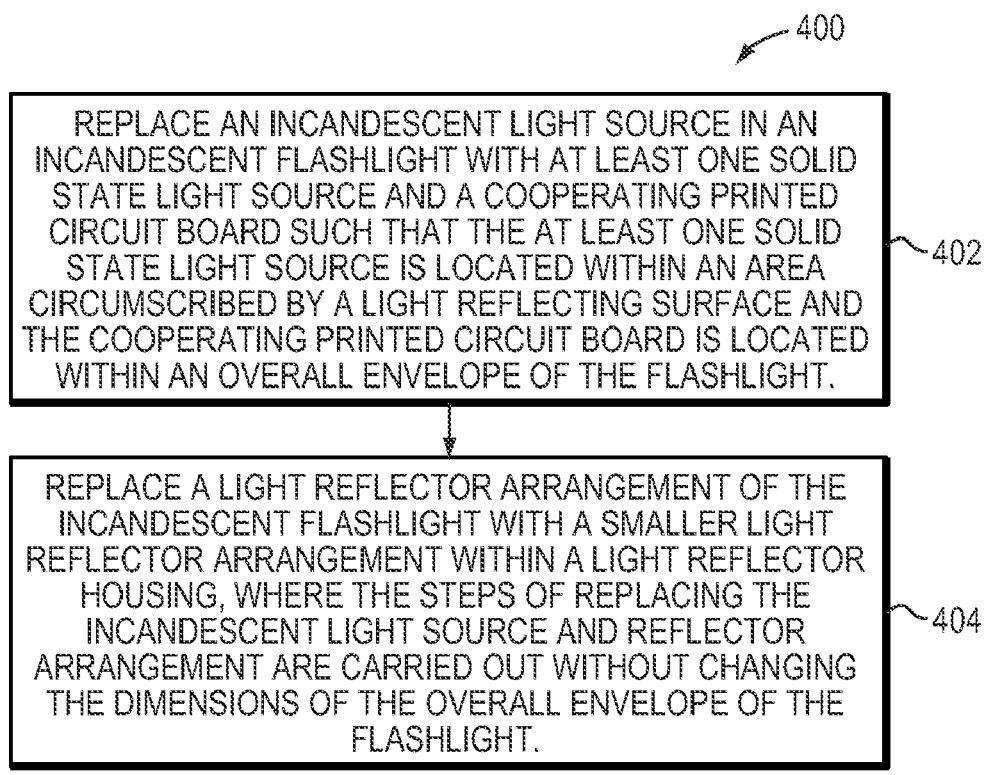
FIG. 5 is a flow diagram of a flashlight related method.

As shown in method 400 in FIG. 5, an incandescent light source in an incandescent flashlight can be replaced with at least one solid state light source and a cooperating printed circuit board such that the at least one solid state light source is located within an area circumscribed by a light reflecting surface and the cooperating printed circuit board is located within an overall envelope of the flashlight, (step 402). A light reflector arrangement of the incandescent flashlight can be replaced with a smaller light reflector arrangement within a light reflector housing, and the steps of replacing the incandescent light source and reflector arrangement are carried out without changing the dimensions of the overall envelope of the flashlight, (step 404).

Figure 6:
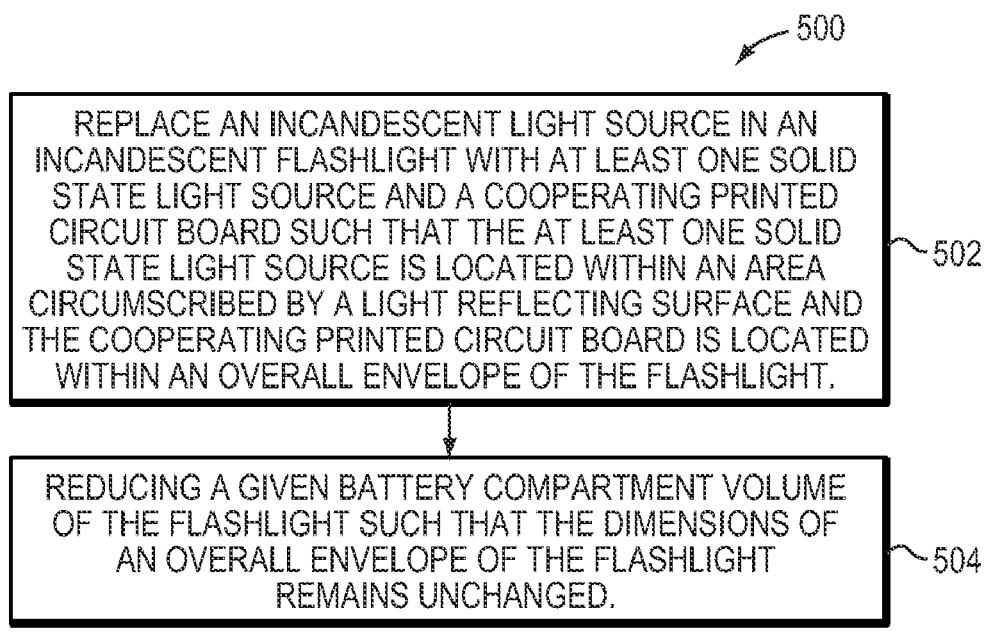
FIG. 6 is another flow diagram of a flashlight related method.

As shown in method 500 in FIG. 6, an incandescent light source can be replaced in an incandescent flashlight with at least one solid state light source and a cooperating printed circuit board such that the at least one solid state light source is located within an area circumscribed by a light reflecting surface and the cooperating printed circuit board is located within an overall envelope of the flashlight, (step 502). A given battery compartment volume of the flashlight can be reduced such that the dimensions of an overall envelope of the flashlight remains unchanged, (step 504).

While this invention is described above with reference to a preferred embodiment, anyone skilled in the art can readily visualize other embodiments of this invention. For example, circuits other than the one described could be used. Also, other shapes for the refractive LED enclosure 2 could be used. Therefore, the scope and content of this invention are not limited by the foregoing description. Rather, the scope and content are delineated by the following claims. While this invention is susceptible to embodiment in many different forms, there are shown in the drawings and will be described herein in detail specific embodiments thereof with the understanding that the present disclosure is to be considered as an example of the principles of the invention and is not to be limited to the specific embodiments described.

Figure 7:
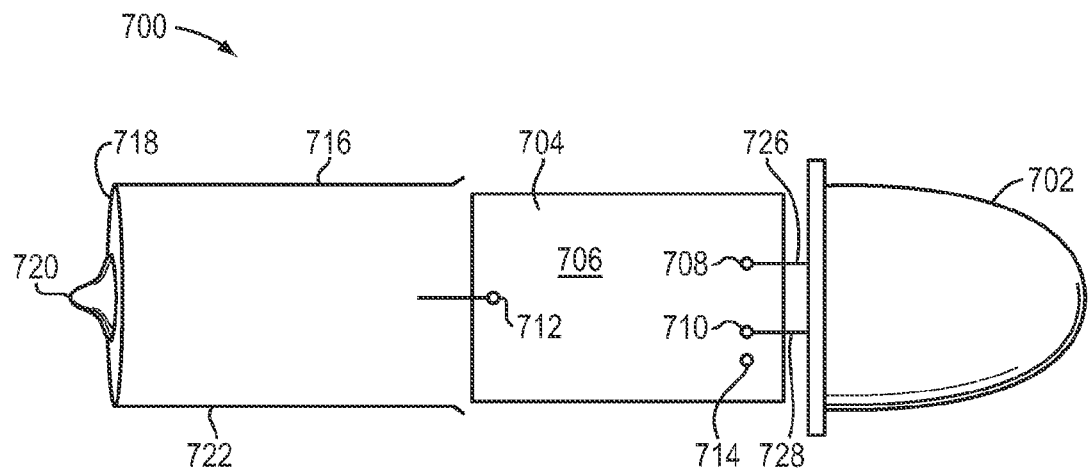
FIG. 7 is a drawing showing a typical embodiment of a universal LED illumination device to retrofit an incandescent lightbulb application.

FIG. 7 is a drawing showing a typical embodiment of a universal LED illumination device to retrofit an incandescent lightbulb application. As illustrated in FIG. 7, an LED illumination device 700 may be made up of an LED lamp 702 that is connected to a printed circuit board 704 by an anode 726 wire at an LED anode connect 708 and a cathode 728 wire and an LED cathode connect 710 located on the printed circuit board 704. This printed circuit board 704 contains electronic circuitry placed in circuit area 706 and is of small size enabling the printed circuit board 704 to fit within the envelope of a standard bulb base 716. Electrical connections from the circuit board 704 to the bulb base 716 are made via a $V_{in}$ positive 712 connector in connection with $+V_{in}$ contact 720 on the external distal apex of the bulb base and a $V_{in}$ negative 714 connector in connection with $-V_{in}$ contact 722 on the side edge of the bulb base 716. The $+V_{in}$, contact 720 and the $-V_{in}$ contact 722 are isolated from one another by an insulator 718. The aforementioned configuration allows the LED illumination device 700 to conform to a standard bulb envelope thereby allowing the embodiment to be utilized as a replacement for conventional incandescent bulbs in a variety of applications. This replacement of incandescent lights with LED illumination affords numerous operating advantages. The disclosed LED embodiments are able to emit light in a narrow wavelength range resulting in the bulk of the energy consumed by the device to be emitted as visible light, thereby delivering much higher electrical to optical conversion efficiency than incandescent technology. Although red, green, and blue LEDs can be combined to produce white light, UV emitting LEDs can be used with fluorescing materials to produce white light for general illuminating applications. Such LEDs have very long life compared to incandescent lights (50,000 hours vs. 3-30 hrs for incandescent flashlight bulbs) in addition to the high efficiency of LEDs.

Figure 8:
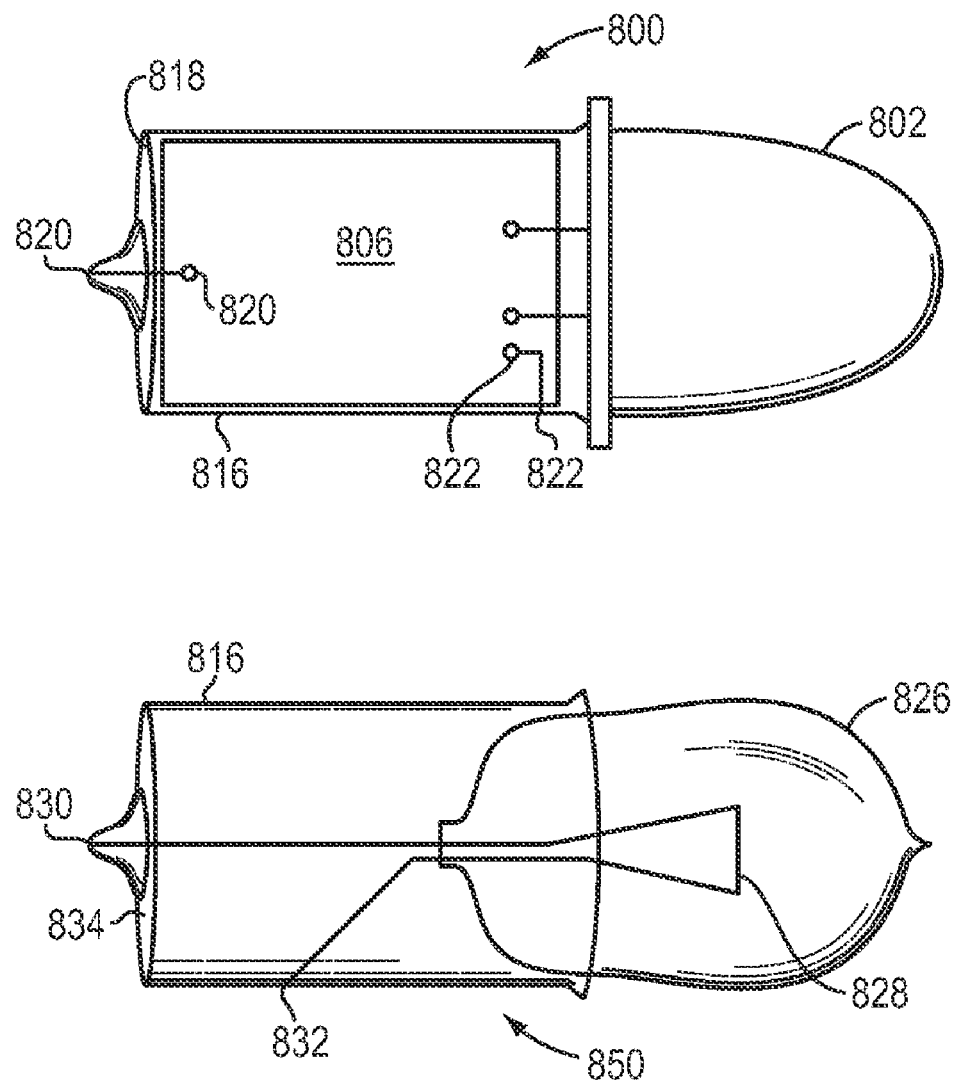
FIG. 8 is a drawing showing a typical embodiment of a universal LED illumination device in relation to an incandescent lightbulb.

FIG. 8 is a drawing showing a typical embodiment of a universal LED illumination device in relation to an incandescent lightbulb. As illustrated in FIG. 8, an LED illumination device 800 is contrasted with an incandescent lightbulb 850. A comparable size and functional relation is demonstrated in the disclosed embodiment of an LED lamp 802 driven by a logic circuit 806 in connection with a standard bulb base 816, mimicking the envelope of an incandescent bulb 826 with a resistive lighting filament 828 in a standard bulb base 816. Both designs include a base 816 with $+V_{in}$, contact, 820 and 830, and $-V_{in}$ contacts 822 and 832 isolated from one another by insulators 818 and 834. FIG. 8 further demonstrates the ability of an LED illumination device 800 to retrofit conventional incandescent bulbs in a variety of applications.

Figure 9:
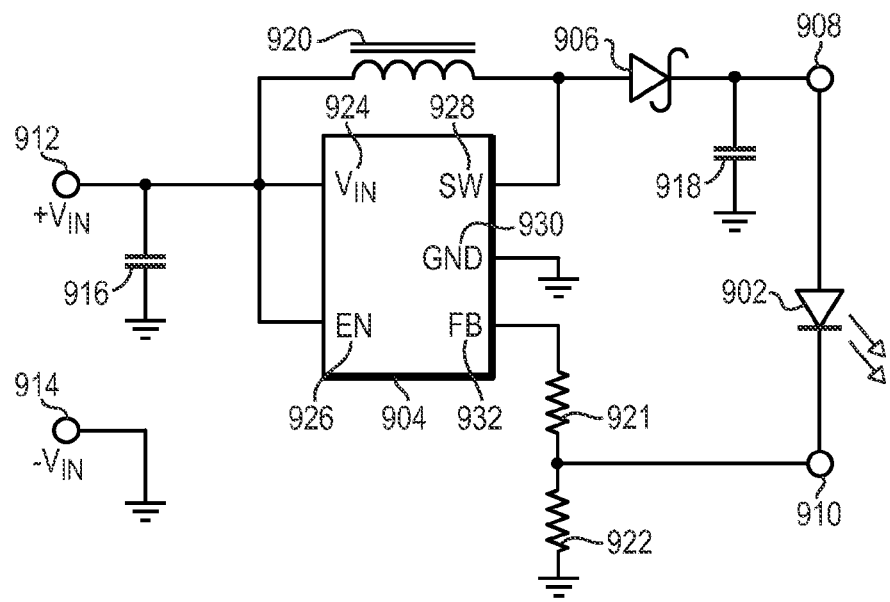
FIG. 9 is a schematic representation of a DC circuit used for a typical embodiment of a universal LED illumination device.

FIG. 9 is a schematic representation of a DC circuit used for a typical embodiment of a universal LED illumination device. A high frequency, low power DC-to-DC converter circuit is utilized to drive the LED 902 in the disclosed embodiment illustrated in FIG. 9. The high frequency of operation allows components of small size to be used. A positive voltage source is introduced at $+V_{in}$ 912 and branched to a capacitor 916 and inductor 920 and to two inputs ($V_{in}$ 924 and EN 926) of a switching circuit 904. The solid-state switching circuit 904 regulates the input voltage $V_{in}$ 924 to a specified value to achieve a switched output at SW 928 by receiving an enable signal 926 branched from $V_{in}$ 924. The inductor 920 is charged during the ON cycle phase of SW 928 and discharges in the OFF cycle phase to achieve the desired switched voltage output driving a Schottky diode 906 that in turn drives the anode side 908 of the output LED 902 and capacitor 918 which is terminated to ground. This Schottky diode 906 allows the current to flow in only one direction to the anode side 908 of the LED 902 via SW 928. The Schottky diode 906 also assures that there is a quantity of rectification of the AC signal flowing through the circuit so that the LED only sees half of the AC cycle, effectively acting as a DC signal. Capacitor 918 becomes a charge reservoir, averaging out what would otherwise be a sinusoidally varying voltage with one half of the sine wave missing.

The cathode side 910 of the LED 902 is pass through ground via resistor 922 and branched to the feedback FB pin 932 of the switching circuit 904 through resistor 921. The FB pin 932 acts as half of an operational amplifier that is comparing the voltage at resistor 922 above ground, to a reference voltage, (i.e., 1.23V). When the voltage at resistor 922 reaches its reference voltage, the switching circuit 904 stops supplying current. The FB pin 932 therefore serves as feedback reference within the switching circuit 904, determining the current values by comparing a feedback voltage to its internal reference and deciding whether more or less charge is needed, thereby regulating the circuit current. $-V_{in}$ 914, capacitors 916 and 918, resistor 922 and the ground terminal 930 of the switching circuit 904 are all terminated to ground.

In a constant current implementation, a current sense resistor is used to provide the voltage feedback. An integrated circuit of small size, Texas Instruments TPS61040 or TPS61041 is suitable for this purpose. Although designed for DC-to-DC operation in a suitable voltage range, the circuit can be easily modified to work at higher voltages by using a zener diode resistor combination, or to operate as an AC-to- DC converter by adding a rectifier circuit. Additional operational features such as light sensors, pulse circuits etc., can be added to provide for flashing operation or dimming. Multiple colored LEDs can be used to vary the desired colored output. Although only one LED is shown, several LEDs can be combined in a series circuit, parallel circuit or series-parallel circuit up to the limitations of the IC used. An appropriate LED may be chosen for use in this circuit to suit the particular application and sized to closely match the bulb dimensions and intensities of conventional lamps. Hence, by combining this circuit on a small form factor circuit board into an existing bulb base, together with the LED, a product can be obtained that has nearly identical or even superior form, fit, and function to traditional incandescent lamps. The circuit shown in FIG. 9 can be implemented in either a constant voltage output design or a constant current output design. The constant current design has advantages since light output is directly proportional to current, whereas slight variations in the LED manufacture require different operating voltages for a specific light output.

Because the circuit shown in FIG. 9 can be extremely compact, it can be incorporated in nearly any standard bulb base. With this implementation, the operating input voltage of the circuit is very wide (at least 1.5 V to 7 Volts), effectively drawing nearly all of the energy present in the battery pack, thereby making excellent utilization of available power. The disclosed circuit will allow the LED light bulb to maintain constant light output under a wide range of voltage input. For example, a 6 V battery pack will still operate the LED, at full brightness, when it only delivers slightly in excess of 1.5 V. In other words, when the batteries are effectively "dead" with respect to conventional light bulbs, this embodiment will continue to operate as though the batteries were at full capacity. There is little or no change in the light output from 6 V down to approximately 1.5 V, allowing for the use of nearly all the energy available from the battery. In addition, a 3 V battery pack and a 6 V battery pack for example, would use exactly the same light bulb, being completely interchangeable.

The circuit detailed in FIG. 9 can be readily expanded or combined with additional circuitry to introduce a variety of additional functions to the device. These functions may include but are not limited to: a dimming feature that allows the bulb to be used at one or more brightness levels; brightness levels being used as a power saving mode or as an indication of low battery or deficient external power; an automatic shut-off timer function; light output color changes; variable light beam direction; backup power supply; combination of incandescent and LED lighting; voice activation; or the like.

Figure 10:
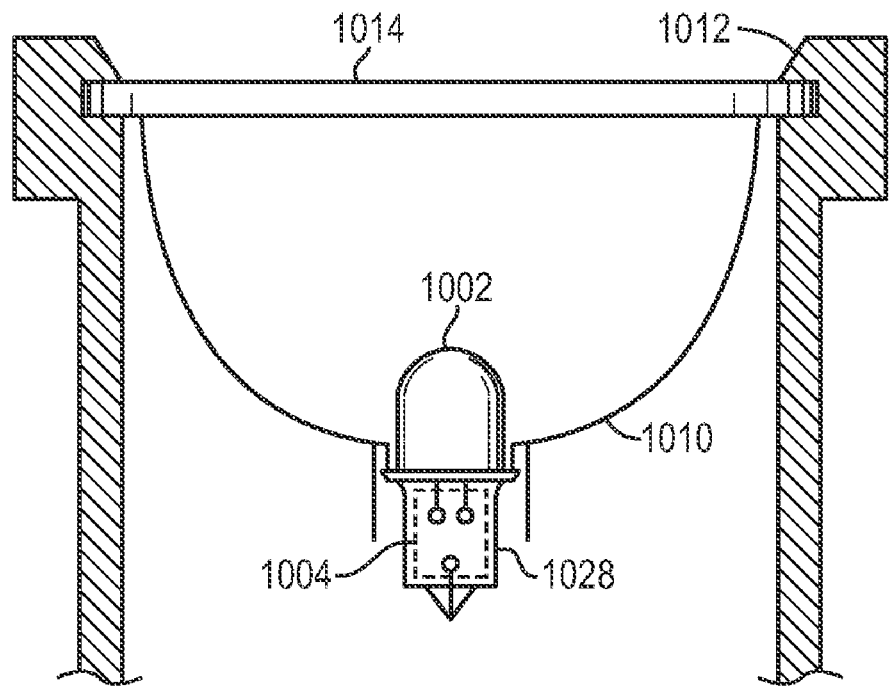
FIG. 10 is a drawing showing a typical embodiment of a universal LED illumination device in relation to an incandescent flashlight bulb application.
Figure 10:
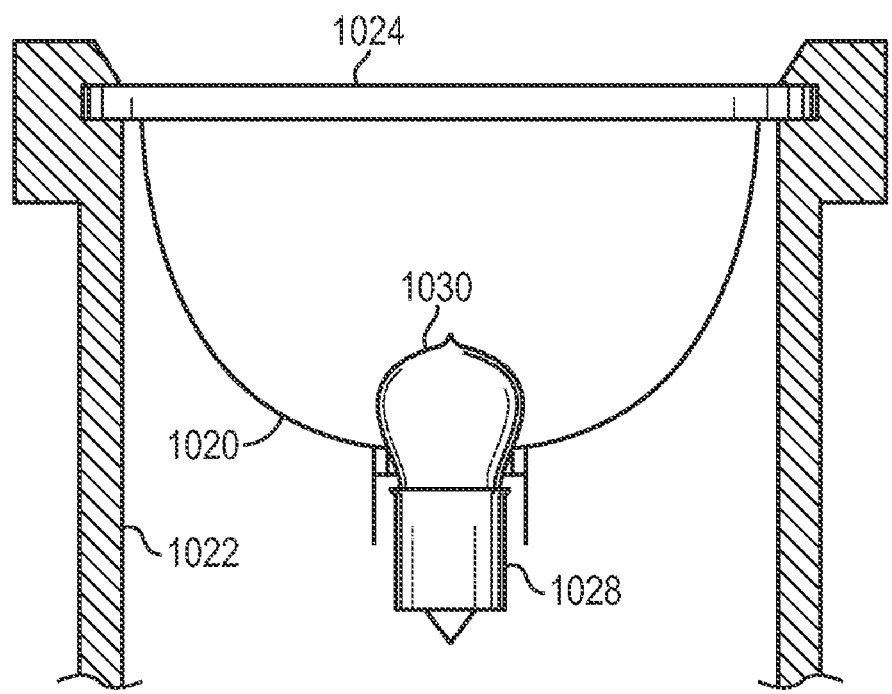

FIG. 10 is a drawing showing a typical embodiment of a universal LED illumination device in relation to an incandescent flashlight bulb application. As illustrated in FIG. 10, a flashlight body 1022 containing a standard incandescent bulb 1030 with a standard bulb base 1028 is fixed within a reflector 1020 to reflect and project a beam of light through reflector cover 1024. This same configuration can be utilized with an LED lamp 1002 as the light source. In this application, a flashlight body 1012 contains an LED lamp 1002 with a standard bulb base 1028. A circuit board 1004 containing the necessary driver circuit and electronics for the LED lamp 1002 is housed within this standard bulb base 1028 thereby providing an overall envelope which is nearly identical to it in the incandescent bulb. The LED lamp 1002 is similarly fixed within a reflector 1010 to reflect and project a beam of light through reflector cover 1014. This embodiment enables a single circuit and lighting device to be used with a variety of bulb bases thereby affording is an economic advantage both in manufacturing as well as to the user who may transfer the product to more than one application or stock one kind of bulb for multiple applications. This circuit is designed to adapt to various AC or DC power sources and accommodate the different voltages that may be present.

Figure 11:
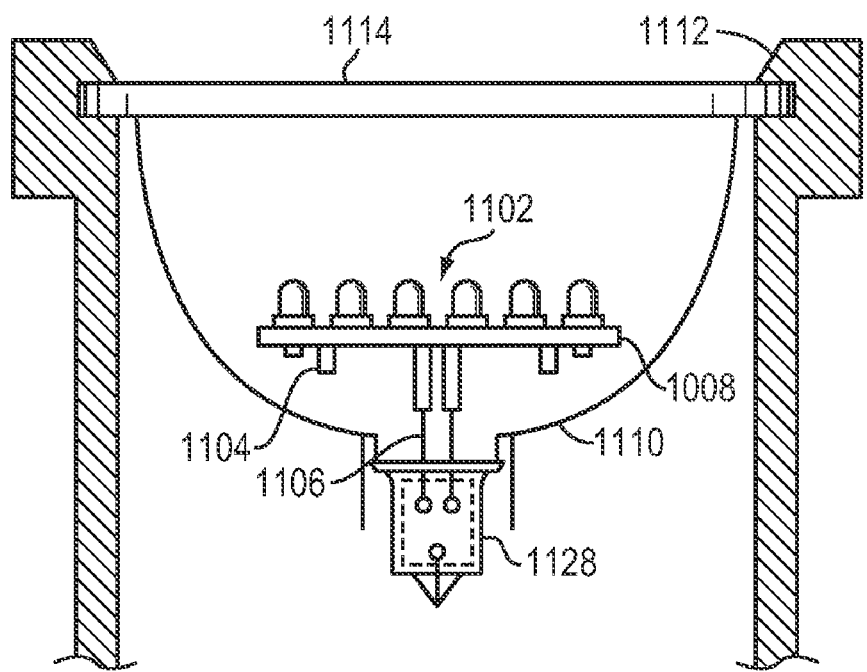
FIG. 11 is a drawing showing a typical embodiment of a universal LED array illumination device in relation to an incandescent flashlight bulb application.
Figure 11:
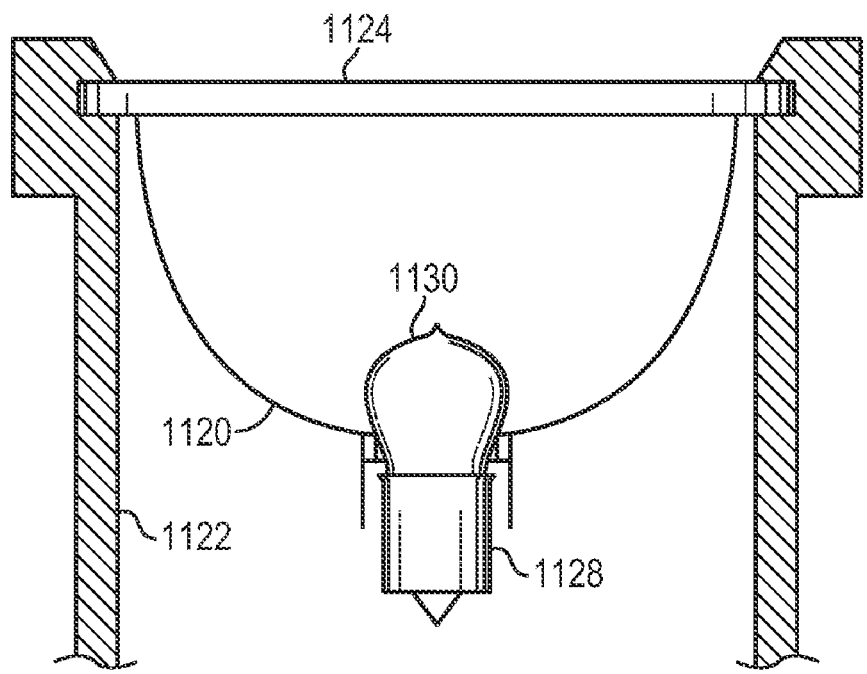

FIG. 11 is a drawing showing a typical embodiment of a universal LED array illumination device in relation to an incandescent flashlight bulb application. As illustrated in FIG. 11, a flashlight body 1122 containing a standard incandescent bulb 1130 with a standard bulb base 1128 is fixed within a reflector 1120 to reflect and project a beam of light through reflector cover 1124. This same configuration can be utilized with an LED array 1102 of lamps as the light source. In, this application, a flashlight body 1112 contains an LED array 1102 of lamps while still utilizing a standard bulb base 1128. The LED array 1102 can be mounted on a flat surface, such as a printed circuit (PC) board 1108. In this embodiment, a PC board is equipped on its top surface with one or more LEDs connected in either a series or parallel circuit. This top surface may (or may not) contain electronic components such as ICs, resistors, capacitors and the like. The bottom surface may also contain circuitry and its associated electronic components such as a DC-to-DC converter circuit 1104 and may contain an electrical connector 1106 which mates to a complimentary connector mounted within a standard bulb base 1128. The bulb base 1128 in this example is used to make electrical connections to an electrical source (not shown) and deliver the power to the wafer-shaped PC board 1108. This DC-to-DC converter circuit 1104 is designed to adapt to various power sources and accommodate the different voltages that may be present. Similar circuits may be utilized to allow the aforementioned embodiments to be powered by either AC or DC source current. The LED array 1102 is similarly fixed within a reflector 1110 to reflect and project a beam of light through reflector cover 1114. This embodiment enables a single circuit and lighting device to be used with a variety of bulb bases thereby affording is an economic advantage both in manufacturing as well as to the user who may transfer the product to more than one application. This single circuit is designed to adapt to various AC or DC power sources and accommodate the different voltages that may be present.

Figure 12:
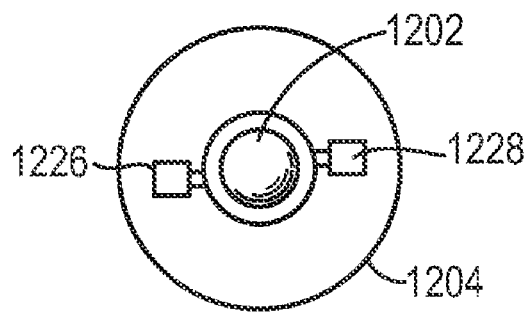
FIG. 12 is a drawing showing a typical embodiment of a universal LED illumination device to retrofit an incandescent lightbulb application.
Figure 12:
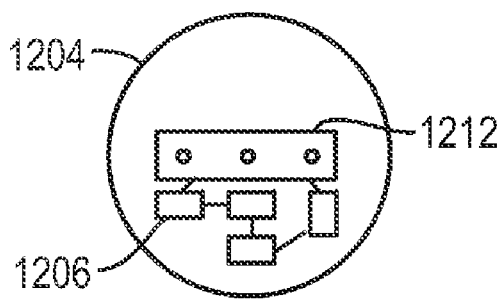
Figure 12:
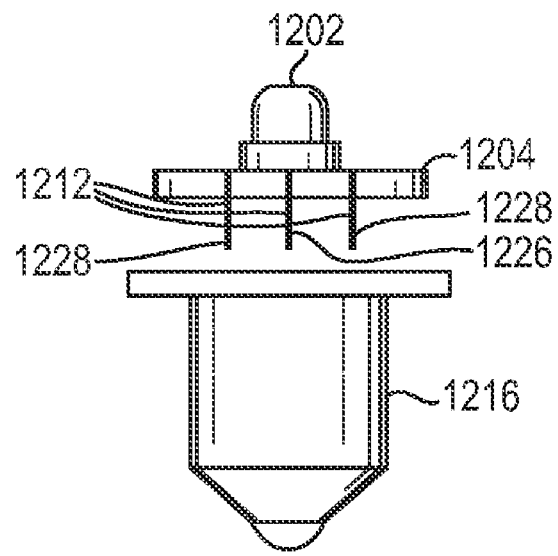

FIG. 12 is a drawing showing a typical embodiment of a universal LED illumination device to retrofit an incandescent lightbulb application. As illustrated in FIG. 12, an LED 1202 is mounted to a wafer PC board 1204 such that the LED 1202 will project light outward and approximately perpendicular to the top surface of the PC board 1204. The LED 1202 is mounted to the PC board 1204 by an anode 1226 and cathode 1228 attachments on the top surface. The converter and logic circuit 1206 can be mounted on either or both sides of the wafer PC board 1204 and are shown in FIG. 12 on the bottom surface. This LED 1202 and associated converter and logic circuit 1206 are connected to a 3-pin connector 1212 that facilitates an easy connection to a standard bulb base 1216. This connection is made through a single anode 1226 connector located in the center of the 3-pin connector 1212, and two cathode 1228 connectors that have been bifurcated from the LED 1202 and placed lateral to the anode 1226. This cathode geometry allows the LED and circuitry module to be placed into connection in either left or right orientation within the 3-pin connector 1212.

Figure 13:
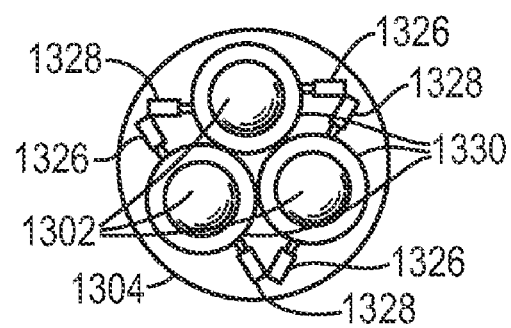
FIG. 13 is a drawing showing a typical embodiment of a universal LED illumination device to retrofit an incandescent lightbulb application.
Figure 13:
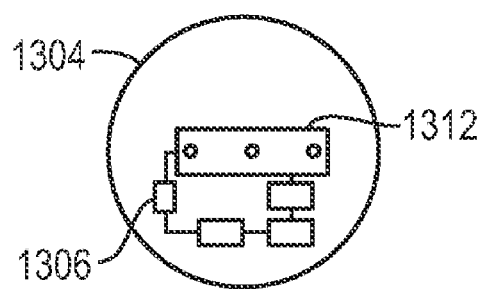
Figure 13:
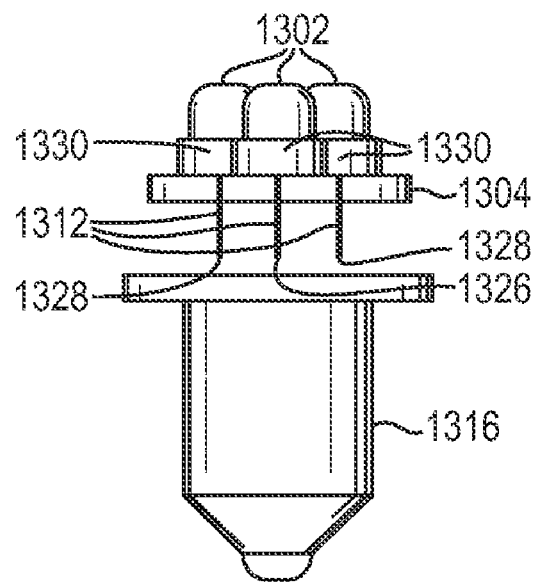

FIG. 13 is a drawing showing a typical embodiment of a universal LED illumination device to retrofit an incandescent lightbulb application. As illustrated in FIG. 13, a set of LEDs 1302 (each on an LED holder 1330) is mounted in a triangular pattern to a wafer PC board 1304 in either a series or parallel configuration such that the LEDs 1302 will project light outward and approximately perpendicular to the top surface of the PC board 1304. The LEDs 1302 are mounted to the PC board 1304 by an anode 1326 and cathode 1328 attachments for each LED 1302 on the top surface. The converter and logic circuit 1306 can be mounted on either or both sides of the wafer PC board 1304 and are shown in FIG. 13 on the bottom surface. These LEDs 1302 and associated converter and logic circuit 1306 are connected to a 3-pin connector 1312 that facilitates an easy connection to a standard bulb base 1316. This connection is made from each LED through to a single anode 1326 connector located in the center of the 3-pin connector 1312, and two cathode 1328 connectors that have been bifurcated from each LED 1302 and placed lateral to the anode 1326. This cathode geometry allows the LED and circuitry module to be placed into connection in either left or right orientation within the 3-pin connector 1312.

Figure 14:
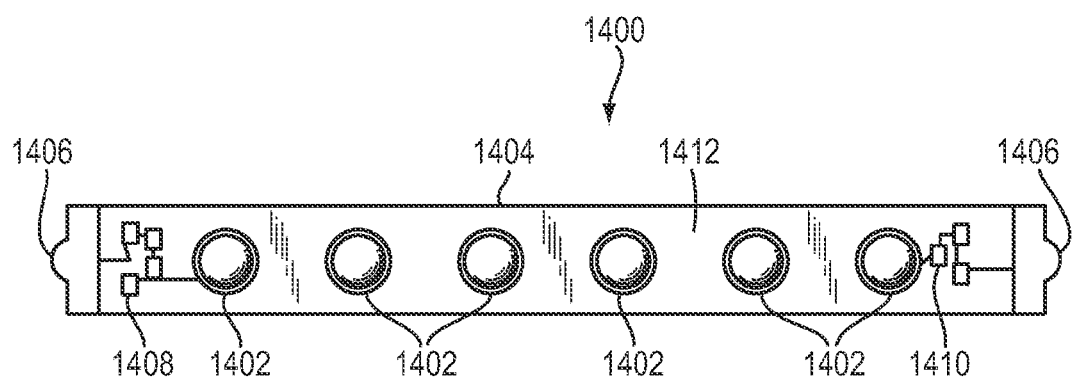
FIG. 14 is a drawing showing a typical embodiment of a universal LED illumination device to retrofit a halogen lightbulb application.

FIG. 14 is a drawing showing a typical embodiment of a universal LED illumination device to retrofit a halogen lightbulb application. As illustrated in FIG. 14, a group of LEDs 1402 is mounted to a PC board 1404 such that the LEDs 1402 will project light outward and perpendicular to the top surface of the PC board 1404 to produce an LED halogen replacement bulb 1400. The converter and logic circuit 1408 can be mounted on either or both sides of the wafer PC board 1404 and are shown in FIG. 14 on the top surface. This top surface can be coated with a reflective surface 1412 to increase light output intensity by reflecting light otherwise lost and enhance heat dissipation of the LEDs and circuitry. These LEDs 1402 and associated converter and logic circuit 1408 are made to connect employing "bump ends" 1406 that adapt the PC board to fit and electrically connect within halogen bulb fixtures. The large area of PC board 1404 space additionally allows for additional circuitry 1410 to be readily added to either side of the described embodiment.

Figure 15:
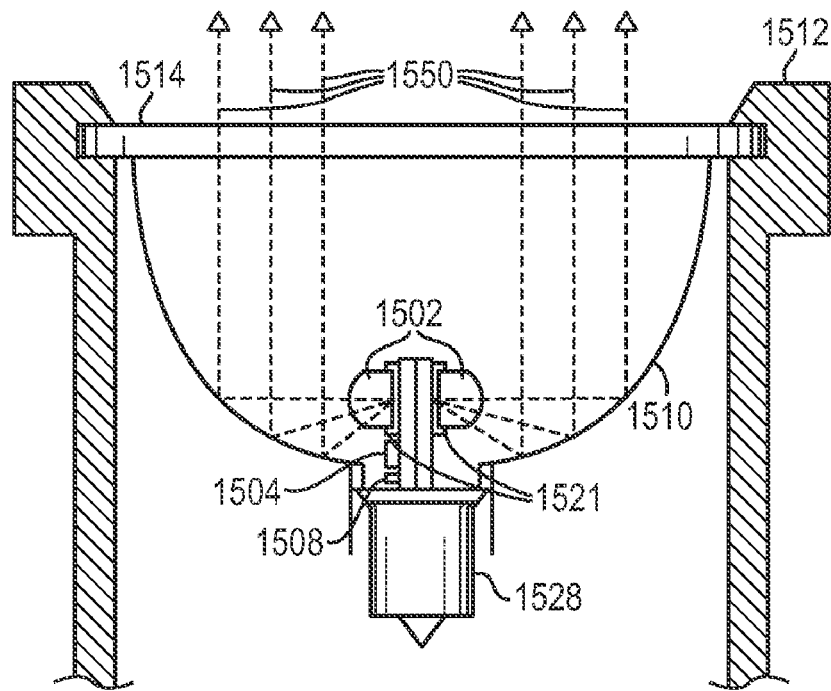
FIG. 15 is a drawing showing a typical embodiment of a universal LED illumination device to retrofit a focused beam incandescent flashlight application.
Figure 15:
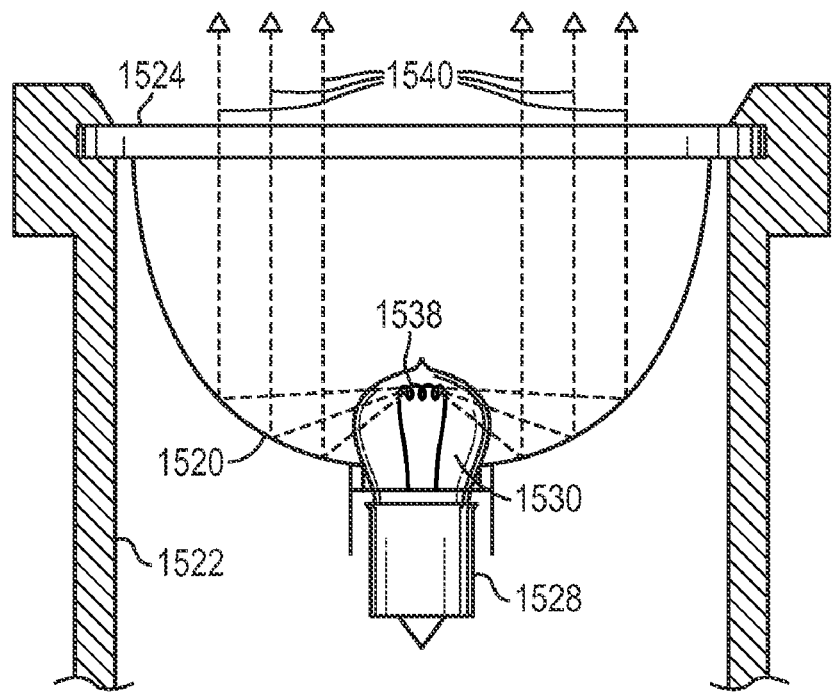

FIG. 15 is a drawing showing a typical embodiment of a universal LED illumination device to retrofit a focused beam incandescent flashlight application. In particular products such as flashlights, a reflective parabolic reflector is an integral part of the product's feature set. In certain applications, the reflective reflector can be moved up and down by rotating a portion of the flashlight's barrel. When this is done, the reflector moves up and down thereby moving the bulb above, through and below the prime focus of the parabolic reflector. This has the effect of focusing or dispersing the light beam to give either a narrow spot or broad beam. Because LEDs usually contain focusing optics, a forward mounting as described above is usually an adequate implementation. However, to take advantage of unique features that may already be present in existing applications, an aftermarket implementation that addresses these specific features and associated needs is necessary.

As illustrated in FIG. 15, a flashlight body 1522 containing a standard incandescent bulb 1530 with a standard bulb base 1528 is fixed within a reflective parabolic reflector 1520 to reflect and project a beam of light through reflector cover 1524. The reflector 1520 acts to reflect the light emanating from the filament in a standard incandescent bulb 1530 to a focused light beam 1540. A similar configuration can be utilized where an LED replacement bulb is designed to allow light to emanate from one or more LEDs 1502 mounted to a PC board 1508 in flashlight body 1512. In this embodiment, the planar axis of the PC board 1508 is mounted within a standard bulb base 1528 and positioned parallel to a focused beam of light 1550. As illustrated in FIG. 15, two LEDs 1502 are used, one each on either side of a metal core PC board 1508. The LEDs 1502 in this embodiment send their light directly towards the surface of the parabolic reflector 1510 and project as a focused light beam 1550 through reflector cover 1514.

The LEDs 1502 are positioned such that they are in the same position relative to the focal point on the parabolic reflector 1510 as the filament 1538 is in the incandescent bulb 1530 it replaces. In this way, the focusing/defocusing feature works as it was intended to since the light is emitted either above or below the prime focus. Hence, both the user and the manufacturer can employ this product and gain the advantages of high efficiency and long life of the LEDs without losing the optical features of the product. Either surface of the PC board 1508 may also contain circuitry and associated electronic components such as a DC-to-DC converter circuit 1504 and may contain an electrical connector that mates to a complimentary connector (not shown) mounted within a standard bulb base 1528. The bulb base 1528 in this example is used to make electrical connections to an electrical power source (not shown) and deliver the power to the PC board 1508.

Because the generation of excessive heat is a great detriment to the LED and associated circuitry, additional elements can easily be added to the disclosed embodiments such as the incorporation heat sink devices 1521 or materials in or on the PC board. A metal core PC board 908A is shown in this embodiment to demonstrate the ease in which heat dissipation techniques can be adapted to the aforementioned embodiments.

Figure 16:
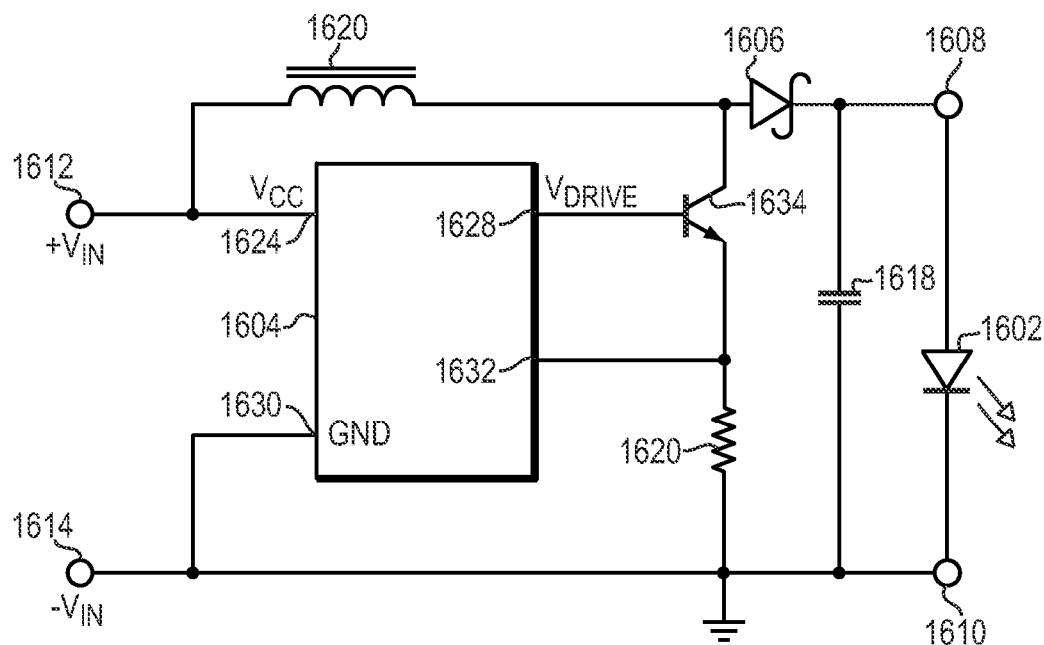
FIG. 16 is a schematic representation of a DC circuit used for a typical embodiment of a universal LED illumination device.

FIG. 16 is a schematic representation of a DC circuit used for a typical embodiment of a universal LED illumination device. Although the circuit of FIG. 9 is well suited for constant current operation of low power LEDs where the current required is on the order of 20 mA, the sense resistor 922 in that circuit dissipates power that may be less than optimal at higher current levels. An alternative higher current, high frequency, DC-to-DC converter circuit that generates a constant power output, ideal for higher current applications, is utilized to drive the LED 1602 in the disclosed embodiment illustrated in FIG. 16.

A positive voltage source is introduced at $+V_{in}$ 1612 and branched to an inductor 1620 and to inputs $V_{CC}$ 1624 of an IC driver circuit 1604 (i.e., Zetex ZXSC310). The solid-state driver circuit 1604 regulates the input voltage $V_{CC}$ 1624 to a specified value to achieve a switched output at $V_{Drive}$ 1628, which in turn drives an external transistor 1634. The inductor 1620 is charged during the ON cycle phase of transistor 1634 and discharges in the OFF cycle phase to achieve the desired switched voltage output driving a Schottky diode 1606 that in turn drives the anode side 1608 of the output LED 1602 and capacitor 1618 which is terminated to ground. This Schottky diode 1606 allows the current to flow in only one direction to the anode side 1608 of the LED 1602 via transistor 1634. The Schottky diode 1606 also assures that there is a quantity of rectification of the AC signal flowing through the circuit so that the LED only sees half of the AC cycle, effectively acting as a DC signal. Capacitor 1618 becomes a charge reservoir, averaging out what would otherwise be a sinusoidally varying voltage with one half of the sine wave missing. A low value sensing resistor 1620 is connected to the ON phase of external transistor 1634 and minimizes power dissipation. The transistor switches ON and allows current to flow through resistor 1620, where the voltage drop provides the necessary current sense input to the current sense pin 1632 of the IC 1604.

The cathode side 1610 of the LED 1602 is pass through ground. When the current at resistor 1620 reaches its reference current, the comparator 1604 stops supplying current.

The current sense pin 1632 therefore serves as feedback reference within the driver circuit 1604, determining the current values by comparing a feedback current to its internal reference and deciding whether more or less charge is needed, thereby regulating the circuit current. $-V_{in}$ 1614, capacitors 1618, and resistor 1620 and the ground terminal 1630 of the driver circuit 1604 are all terminated to ground.

Figure 17:
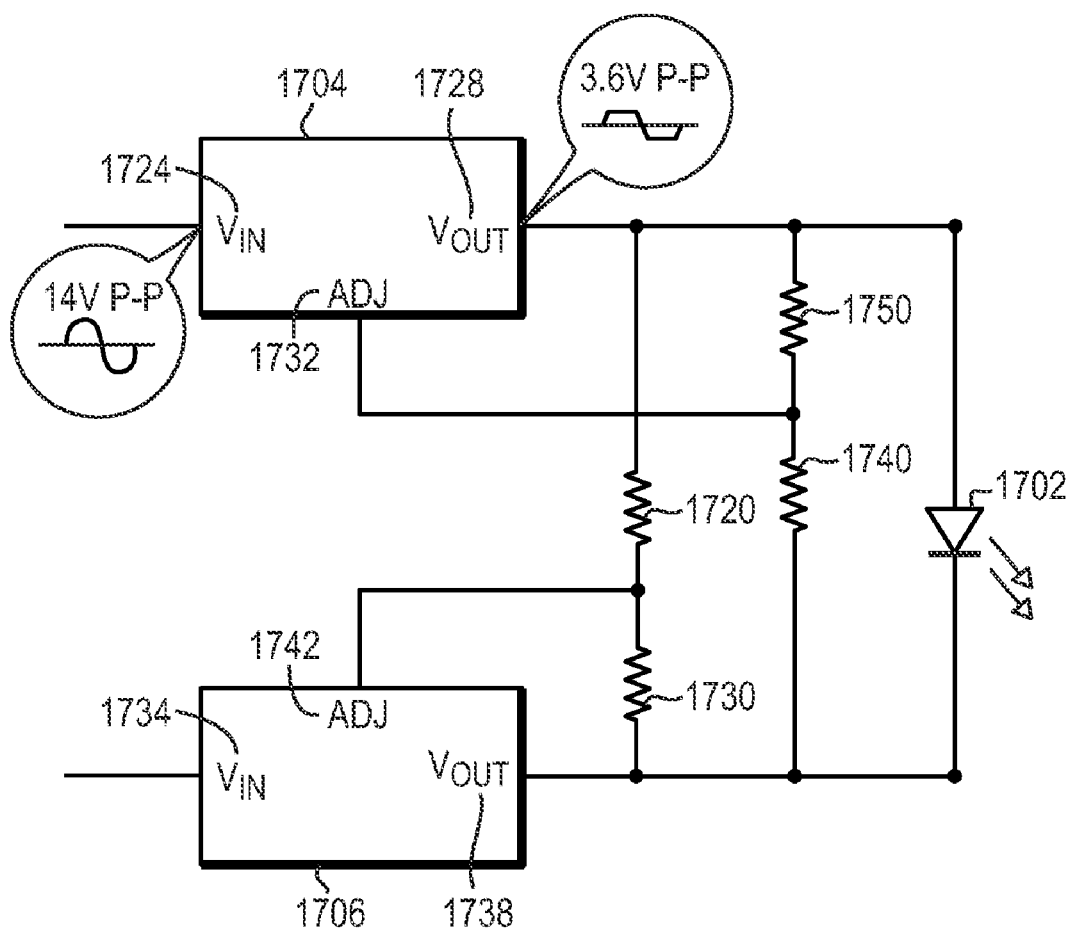
FIG. 17 is a schematic representation of an AC circuit used for a typical embodiment of a universal LED illumination device.

FIG. 17 is a schematic representation of an AC circuit used for a typical embodiment of a universal LED illumination device. Although the circuits of FIG. 9 and FIG. 16 are well suited for DC operation of low power LEDs, FIG. 17 illustrates a typical AC circuit suitable for driving a universal LED illumination device. In the case of bulbs intended for AC applications, a method can be used to rectify the AC voltage to produce a DC signal as referred to above. However, circuits that merely rectify the AC voltage are best suited for use with batteries and when the DC voltage available is less than or equal to the operating voltage of the array of one or more LEDs. For example, with halogen bulbs, a 14V AC source is often used as the power source and is excessive for one or two LEDs. In this instance, an AC voltage regulator may be used in conjunction with the LED that utilizes the inherent property of rectification of an LED that will generally withstand 5 V in reverse bias.

An alternating current voltage source is introduced to two IC regulator circuits 1704 and 1706 (i.e., National LM317) at $V_{in}$ 1724 and $V_{in}$ 1734. The solid-state regulator circuits 1704 and 1706 regulate the positive and negative going potential using the internal voltage reference of the IC and chop the sinusoidal input from, for example 14V peak-to-peak (P-P) to 3.6 V P-P to set the voltage output at $V_{out}$ 1728 and $V_{out}$ 1738. Chopped outputs $V_{out}$ 1728 and $V_{out}$ 1738 feed through parallel ladder path, the first rung containing resistor 1720 and resistor 1730 in series, the second rung containing resistor 1740 and resistor 1750 in series, and the third rung containing an LED 1702. The first rung is connected between resistor 1720 and resistor 1730 to a comparator input ADJ 1732 on regulator circuit 1704 and the second rung is connected between resistor 1740 and resistor 1750 to a comparator input ADJ 1742 on regulator circuit 1706. These comparator inputs ADJ 1732 and ADJ 1742 are used as a feedback loop to compare the external voltage reference to an internal voltage reference $V_{ref}$ to set the voltage output $V_{out}$ 1728A and $V_{out}$ 1738.

In this configuration, the ratio of resistor 1740/resistor 1750 (R3/R4) and resistor 1720/resistor 1730 (R1/R2) determine the positive and negative voltage maximum. Here, the 14 V AC peak-to-peak signal is reduced to nearly a square wave with a 3.6V P-P max being used drive the LED 1702, using the LED 1702 to rectify the signal.

$V_{out}+=V_{ref}(1.25\text{ V}) [1+(R1/R2)]$ is the positive going voltage maximum and $V_{out}-=V_{ref}(1.25\text{V}) [1+(R3/R4)]$ is the negative going voltage maximum.

Generally, the $V_{out}-$ would be kept within a range well tolerated by the reverse characteristics of the LED 1702.

What is claimed is:

1. An illumination device comprising:
   at least one solid-state light emitter each comprising an LED chip embedded in a transparent lens;
   an electrical connector for electrically connecting the at least one solid-state light emitter to a power source and having a shape substantially the same as a shape of an electrical connector for a standard incandescent or halogen bulb;
   a driving circuit in electrical communication with the electrical connector and the at least one solid-state light emitter for providing suitable current to the at least one solid-state light emitter; and
   at least partially surrounding and extending above the lens of each of the at least one solid-state light emitters, a reflective element for directing light emitted by the at least one solid-state light emitter along an emission axis of the illumination device, substantially all of the light emitted by the illumination device being emitted along the emission axis,
   wherein the illumination device is compact enough to fit within a standard volume envelope of an incandescent or halogen lamp.

2. An illumination device comprising:
   at least one solid-state light emitter;
   an electrical connector for electrically connecting the at least one solid-state light emitter to a power source and having a shape substantially the same as a shape of an electrical connector for a standard incandescent or halogen bulb;
   a driving circuit in electrical communication with the electrical connector and the at least one solid-state light emitter for providing suitable current to the at least one solid-state light emitter; and
   at least partially surrounding and extending above the at least one solid-state light emitter, a reflective element for directing light emitted by the at least one solid-state light emitter along an emission axis of the illumination device,
   wherein (i) the illumination device is compact enough to fit within a standard volume envelope of an incandescent or halogen lamp, (ii) a shape of the reflective element defines a portion of a paraboloid, and (iii) the at least one solid-state light emitter is disposed at a focal point of the paraboloid.

3. The illumination device of claim 1, further comprising a heat sink, also fitting within the standard volume envelope of the incandescent or halogen lamp, in thermal communication with the at least one solid-state light emitter for conducting heat therefrom.

4. The illumination device of claim 1, wherein the at least one solid-state light emitter is oriented substantially parallel to the emission axis of the illumination device.

5. The illumination device of claim 4, further comprising a printed circuit board on which the at least one solid-state light emitter is disposed.

6. An illumination device comprising:
   at least one solid-state light emitter;
   an electrical connector for electrically connecting the at least one solid-state light emitter to a power source and having a shape substantially the same as a shape of an electrical connector for a standard incandescent or halogen bulb;
   a driving circuit in electrical communication with the electrical connector and the at least one solid-state light emitter for providing suitable current to the at least one solid-state light emitter; and
   at least partially surrounding and extending above the at least one solid-state light emitter, a reflective element for directing light emitted by the at least one solid-state light emitter along an emission axis of the illumination device,
   wherein (i) the illumination device is compact enough to fit within a standard volume envelope of an incandescent or halogen lamp, (ii) the at least one solid-state light emitter is oriented, and emits light, substantially perpendicular to the emission axis of the illumination device, and (iii) substantially all of the light emitted by the at least one solid-state light emitter is emitted from the illumination device along the emission axis.

7. The illumination device of claim 6, further comprising a printed circuit board on which the at least one solid-state light emitter is disposed.

8. The illumination device of claim 7, wherein the at least one solid-state light emitter comprises at least one solid state-light emitter disposed on each of two opposing surfaces of the printed circuit board.

9. The illumination device of claim 1, further comprising a rotatable housing in which the reflective element and the at least one solid-state light emitter are disposed.

10. The illumination device of claim 9, wherein the reflective element rotates as the housing is rotated.

11. The illumination device of claim 2, wherein the at least one solid-state light emitter comprises at least one light-emitting diode.

12. An illumination device comprising:
at least one solid-state light emitter;
an electrical connector for electrically connecting the at least one solid-state light emitter to a power source and having a shape substantially the same as a shape of an electrical connector for a standard incandescent or halogen bulb;
a driving circuit in electrical communication with the electrical connector and the at least one solid-state light emitter for providing suitable current to the at least one solid-state light emitter; and
at least partially surrounding and extending above the at least one solid-state light emitter, a reflective element for directing light emitted by the at least one solid-state light emitter along an emission axis of the illumination device,
wherein (i) the illumination device is compact enough to fit within a standard volume envelope of an incandescent or halogen lamp, and (ii) the driving circuit comprises a high-frequency DC-to-DC converter.

13. The illumination device of claim 1, wherein the driving circuit comprises an AC-to-DC converter.

14. The illumination device of claim 1, wherein the electrical connector is configured for connection to an AC power source.

15. The illumination device of claim 1, wherein the driving circuit comprises electrically conductive pins received by the electrical connector.

16. The illumination device of claim 1, wherein the illumination device is configured to accept a replaceable lens.

17. The illumination device of claim 16, further comprising a replaceable lens for altering light emitted from the illumination device.

18. An illumination device configured to accept a replaceable lens, the illumination device comprising:
at least one solid-state light emitter;
an electrical connector for electrically connecting the at least one solid-state light emitter to a power source and having a shape substantially the same as a shape of an electrical connector for a standard incandescent or halogen bulb;
a driving circuit in electrical communication with the electrical connector and the at least one solid-state light emitter for providing suitable current to the at least one solid-state light emitter;
at least partially surrounding and extending above the at least one solid-state light emitter, a reflective element for directing light emitted by the at least one solid-state light emitter along an emission axis of the illumination device; and
a replaceable lens for altering light emitted from the illumination device,
wherein (i) the illumination device is compact enough to fit within a standard volume envelope of an incandescent or halogen lamp, and (ii) the replaceable lens comprises a converging lens.

19. The illumination device of claim 17, wherein the replaceable lens comprises a diffusing lens.

20. The illumination device of claim 17, wherein a surface of the replaceable lens is not flat.

* * * * *